(12) United States Patent
Andra et al.

(10) Patent No.: US 6,349,331 B1
(45) Date of Patent: Feb. 19, 2002

(54) MULTIPLE CHANNEL COMMUNICATION SYSTEM WITH SHARED AUTONEGOTIATION CONTROLLER

(75) Inventors: Sateesh Andra; Shankar Channabasappa, both of San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/092,389

(22) Filed: Jun. 5, 1998

(51) Int. Cl.$^7$ .................. G06F 15/16; G06F 15/177
(52) U.S. Cl. .................. 709/220; 709/227; 709/237
(58) Field of Search ................. 709/220, 227, 709/228, 237, 224, 239, 229, 242, 247; 370/248, 365, 438, 445, 465; 710/105

(56) References Cited

U.S. PATENT DOCUMENTS

| | | | | |
|---|---|---|---|---|
| 5,452,420 A | * | 9/1995 | Engdahl et al. | 710/105 |
| 5,557,798 A | * | 9/1996 | Skeen et al. | 709/229 |
| 5,737,316 A | * | 4/1998 | Lee | 370/248 |
| 5,754,552 A | * | 5/1998 | Allmond et al. | 370/465 |
| 5,802,304 A | * | 9/1998 | Stone | 709/227 |
| 5,809,249 A | * | 9/1998 | Julyan | 709/223 |
| 5,872,781 A | * | 2/1999 | Bennett et al. | 370/365 |
| 5,883,894 A | * | 3/1999 | Patel et al. | 709/228 |
| 5,884,041 A | * | 3/1999 | Hurwitz | 370/438 |
| 5,907,553 A | * | 5/1999 | Kelly et al. | 370/433 |
| 5,920,698 A | * | 7/1999 | Ben-Michael et al. | 709/224 |
| 5,923,663 A | * | 7/1999 | Bontemps et al. | 370/445 |
| 5,931,928 A | * | 8/1999 | Brennan et al. | |
| 5,941,955 A | * | 8/1999 | Wilby et al. | 709/242 |
| 6,011,799 A | * | 1/2000 | Kerstein et al. | 370/422 |
| 6,065,073 A | * | 5/2000 | Booth | 710/46 |
| 6,092,117 A | * | 7/2000 | Gladwin et al. | 709/239 |
| 6,108,727 A | * | 8/2000 | Boals et al. | 709/247 |
| 6,112,249 A | * | 9/2000 | Bader et al. | 709/239 |
| 6,148,002 A | * | 11/2000 | Patel et al. | 370/438 |
| 6,169,729 B1 | * | 1/2001 | Feuerstraeter | 370/296 |
| 6,198,727 B1 | * | 3/2001 | Wakeley et al. | 370/247 |

OTHER PUBLICATIONS

Bunch, Bill, "An Introduction to Auto–Negotiation", www.scyld.com, pp. 1–15, Feb. 1995.*
Thompson, G.O. "Work progresses on gigabit Ethernet", Computer, vol.: 30 Issue 5, pp. 95–96, May 1997.*
IEEE, Std 802.3u–1995 "Physical Layer Link Signaling for 10Mb/s and 100 Mb/s Auto–Negotiation on Twisted Pair".

* cited by examiner

*Primary Examiner*—Mark H. Rinehart
*Assistant Examiner*—Marc D. Thompson
(74) *Attorney, Agent, or Firm*—Westman, Champlin & Kelly

(57) ABSTRACT

A multiple channel communication system includes a plurality of network communication ports, a plurality of communication devices and an autonegotiation controller. Each communication device is coupled to a respective one of the plurality of network communication ports. The autonegotiation controller is coupled to and shared by the plurality of communication devices.

1 Claim, 6 Drawing Sheets

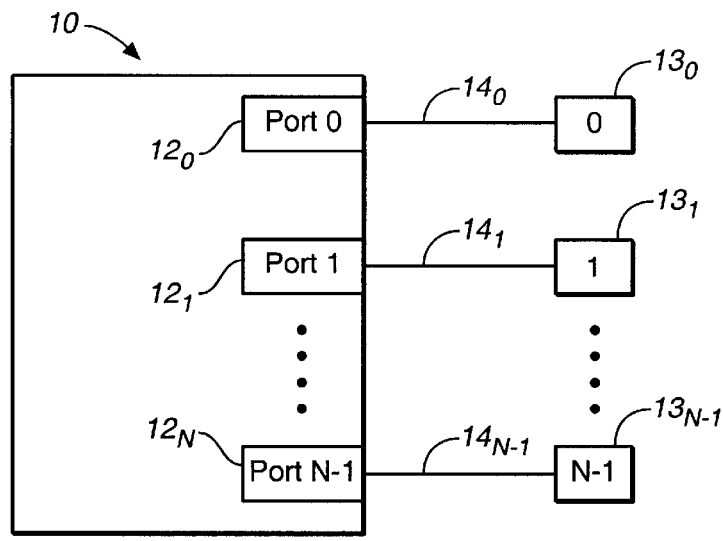
FIG._1
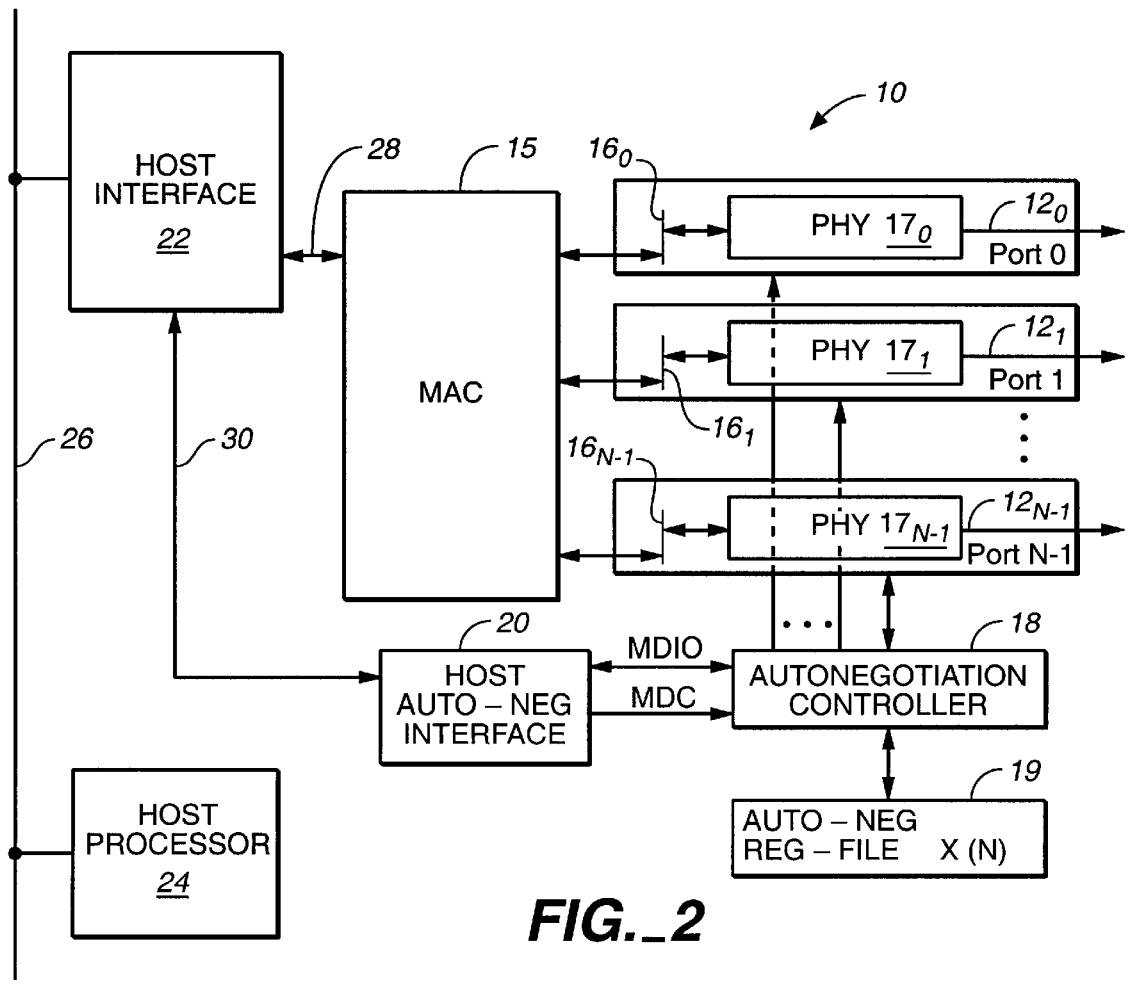
FIG._2

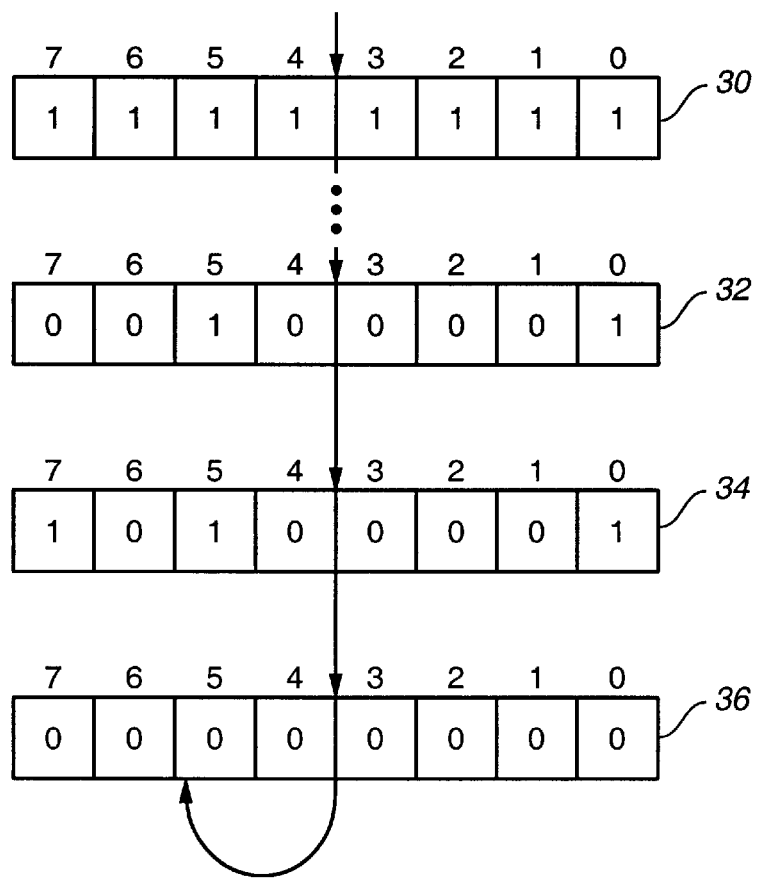
FIG._3A
FIG._3B
FIG._4

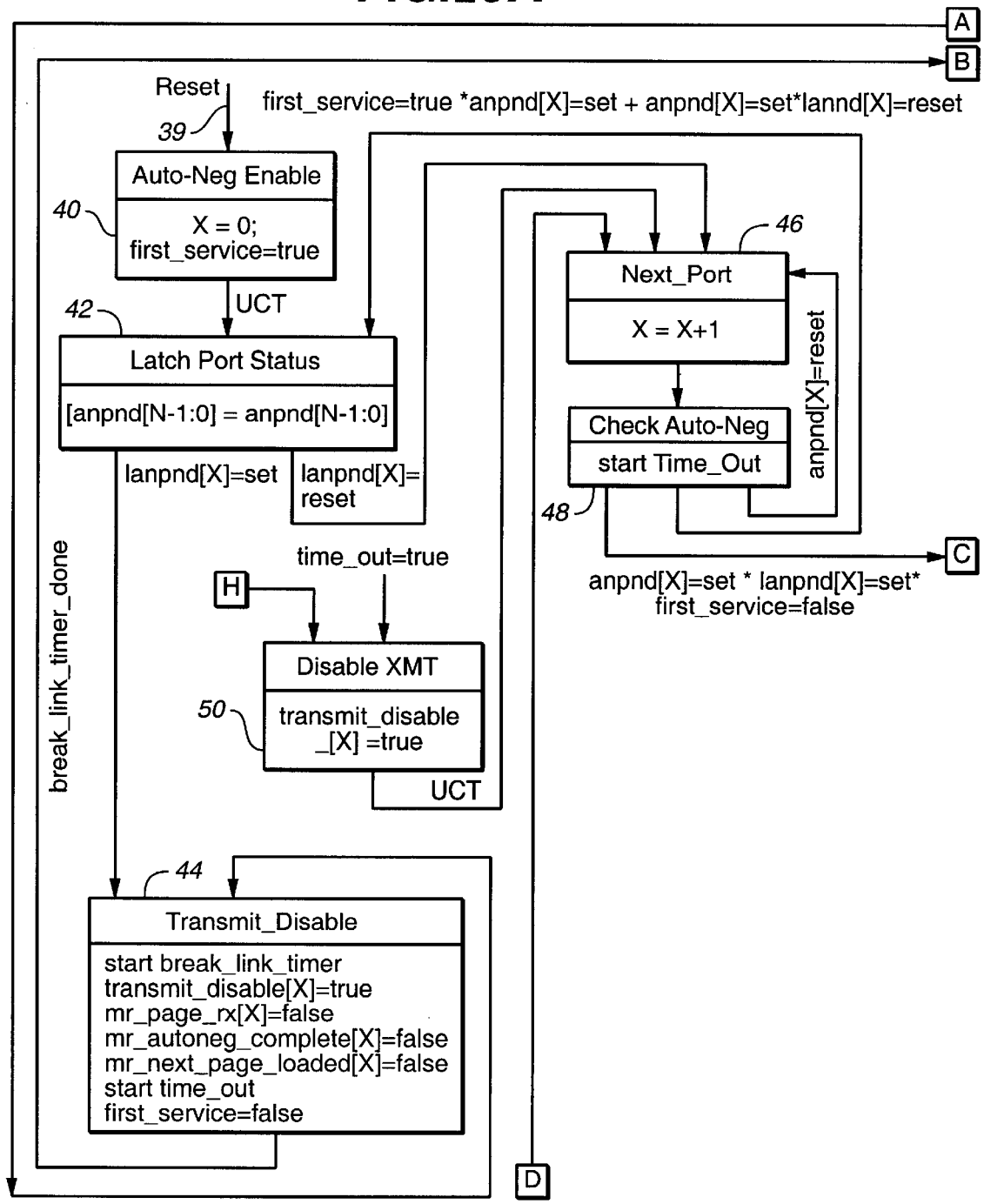
FIG._5A

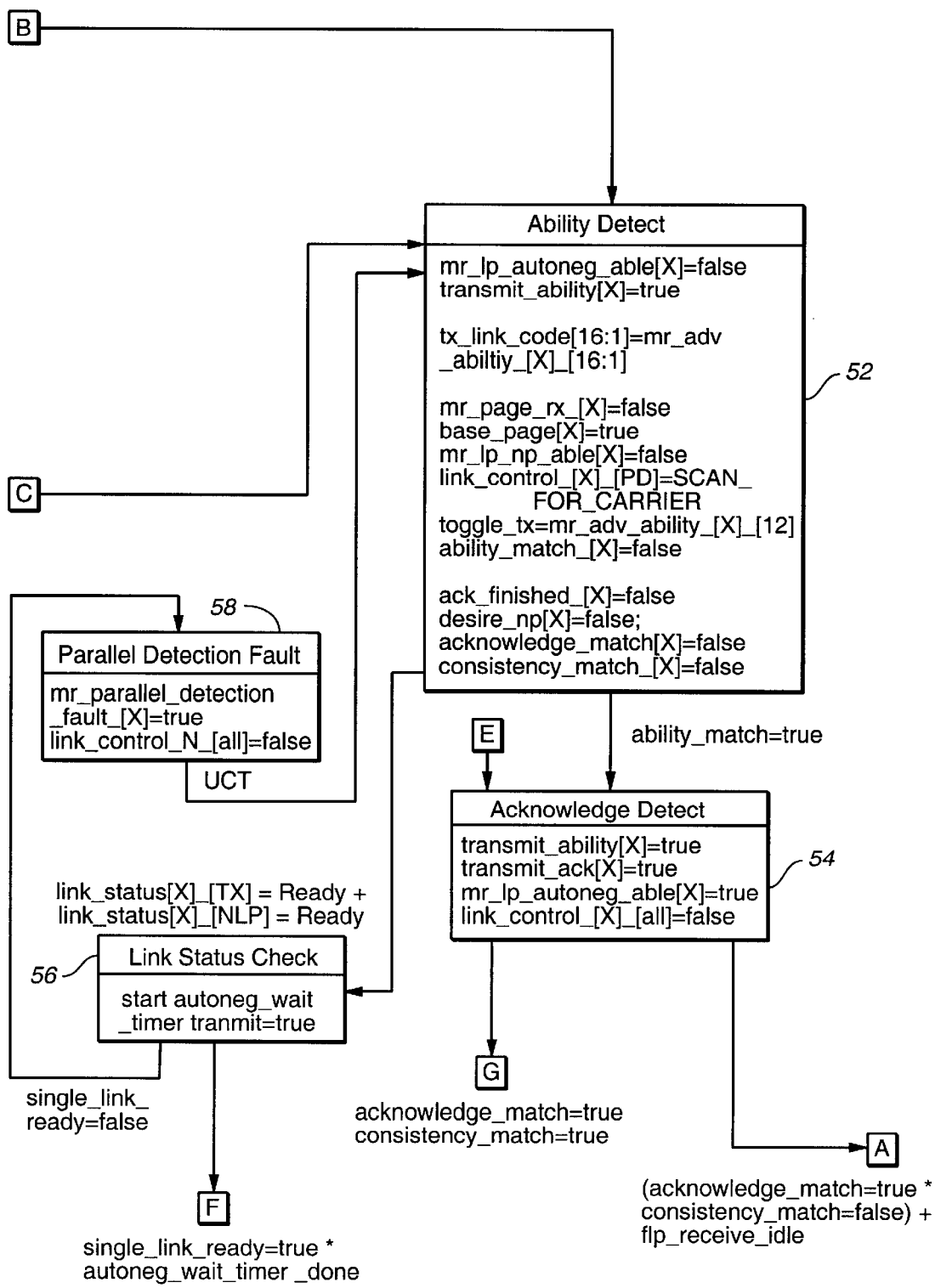
FIG._5B

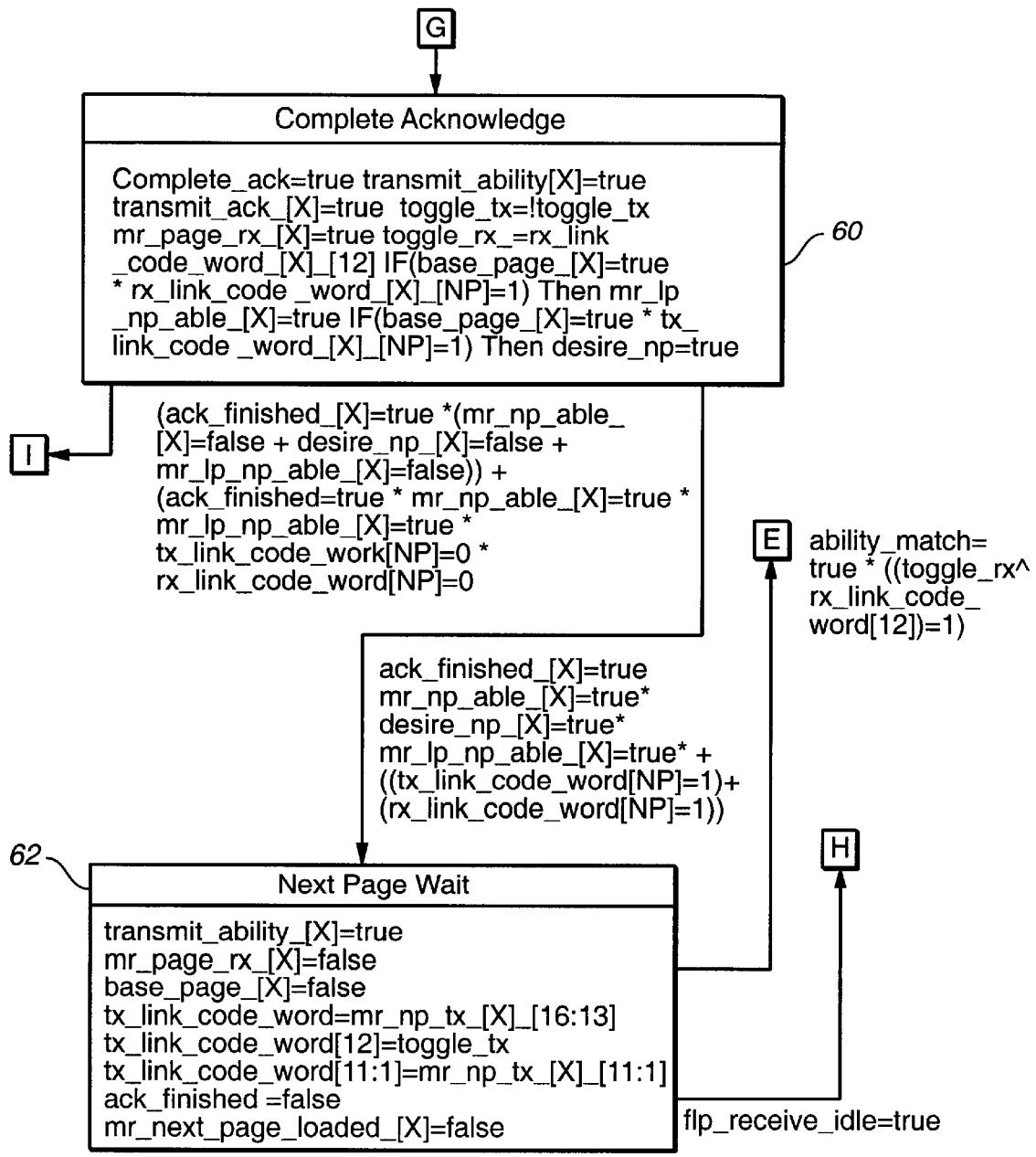
FIG._5C

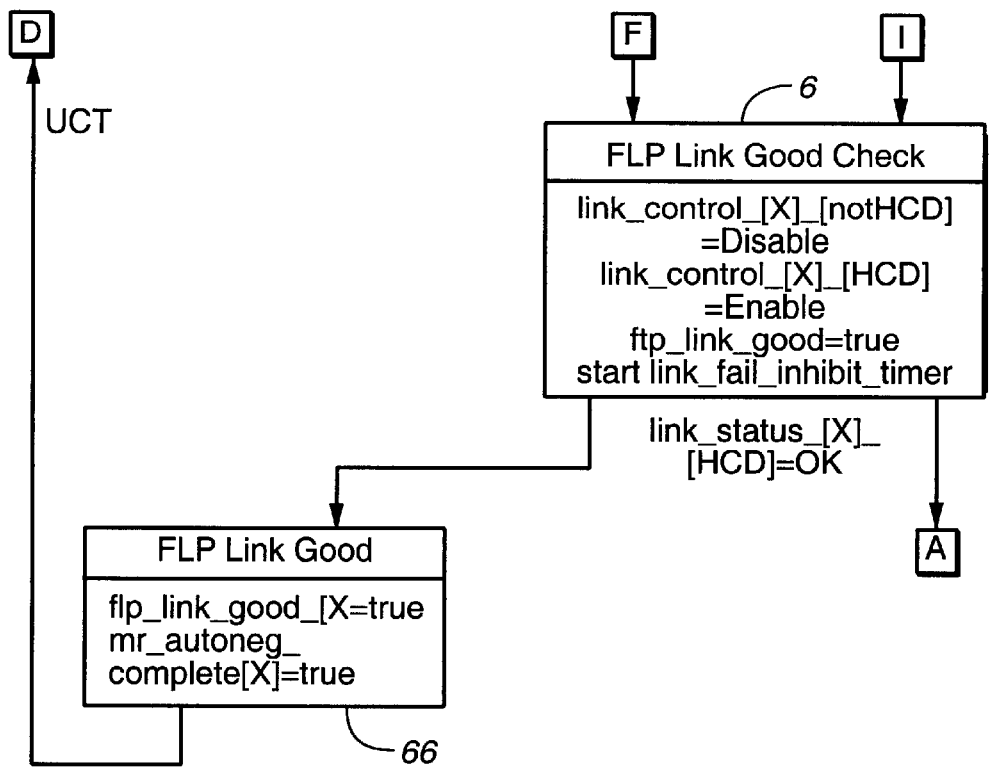
FIG._5D
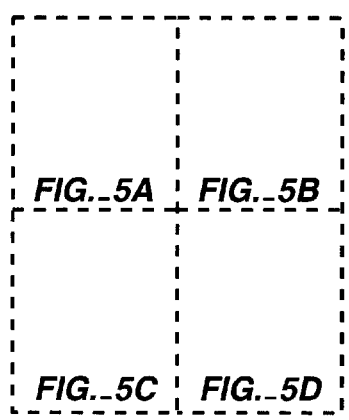
FIG._5E

MULTIPLE CHANNEL COMMUNICATION SYSTEM WITH SHARED AUTONEGOTIATION CONTROLLER

BACKGROUND OF THE INVENTION

The present invention relates to network communication and initialization over an Ethernet local area network (LAN). More specifically the present invention relates to physical layer link signaling with shared autonegotiation.

Ethernet local area networks employ bidirectional communication between a local device such as a computer and its link partner to provide data sharing across the network. With such networks, it is important to provide compatibility to a wide array of devices which may potentially be connected to the network. Because such devices may have varying capabilities, it is necessary during initialization for both the local device and its link partner to exchange information regarding one another's capabilities in order to establish the most efficient common mode of communication. By providing such capability advertisement, various network interface devices may be used with each device operating at the most efficient common setting.

Autonegotiation is a function which provides the exchange of information between the local device and its link partner. A protocol for autonegotiation is specified in ANSI/IEEE Ethernet standard 802.3u-1995, at clause 28. The objective of the autonegotiation function is to provide the means to exchange information between two devices that share a link segment and to automatically configure both devices to take maximum advantage of their abilities.

The autonegotiation function allows the devices at both ends of the link segment to advertise abilities, acknowledge receipt and understanding of the common mode(s) of operation that both devices share, and to reject the use of operational modes that are not shared by both devices. Where more than one common mode exists between the two devices, a mechanism is provided to allow the devices to resolve to a single mode of operation using a predetermined priority resolution function. The autonegotiation function allows the devices to switch between the various operational modes in an ordered fashion; permits management to disable or enable the autonegotiation function; and allows management to select a specific operational mode.

The basic mechanism to achieve auto-negotiation is to pass information encapsulated within a burst of closely spaced link integrity test pulses. This burst of pulses is referred to as a Fast Link Pulse (FLP) burst and includes a Link Code Word which identifies the abilities of the transmitting device. Each device capable of autonegotiation issues FLP bursts at power-up. The devices receiving the FLP bursts extract the Link Code Words from the FLP bursts to determine the communication modes supported by the transmitting devices (i.e. their link partners).

It is becoming more common to integrate four, eight or even sixteen Ethernet ports on a single integrated circuit, such as an Application Specific Integrated Circuit (ASIC). Currently, multi-port integrated circuits have dedicated autonegotiation controllers for controlling the autonegotiation function. Each autonegotiation controller services an individual port and requires about 9000 semiconductor devices or "gates". Each gate requires a certain amount of physical space on the integrated circuit. Since space is limited on an integrated circuit, it is becoming more difficult to integrate higher numbers of ports in a single integrated circuit using the conventional approach.

SUMMARY OF THE INVENTION

The multiple channel communication system of the present invention includes a plurality of network communication ports, a plurality of communication devices and an autonegotiation controller. Each communication device is coupled to a respective one of the plurality of network communication ports. The autonegotiation controller is coupled to and shared by the plurality of communication devices.

Another aspect of the present invention relates to a method of autonegotiating communication configuration information through a plurality of communication devices. The method includes: defining a sequential order for autonegotiating each of the communication devices; maintaining a plurality of autonegotiation status indicators, wherein each autonegotiation status indicator corresponds to one of the plurality of communication devices and indicates whether autonegotiation is required for that communication device; and selectively autonegotiating the communication configuration information through each of the plurality of communication devices in the sequential order based on whether the corresponding autonegotiation status indicator indicates autonegotiation is required.

BRIEF DESCRIPTION OF THE DRAWINGS

FIG. 1 is a system block diagram of a multiple channel communication system coupled to a plurality of link partners in accordance with one embodiment of the present invention.

FIG. 2 is a block diagram of the multiple channel communication system shown in FIG. 1, which employs a shared autonegotiation controller according to one embodiment of the present invention.

FIGS. 3A and 3B are block diagrams of autonegotiation pending registers for storing data indicative of autonegotiation status for a plurality of ports in accordance with the present invention.

FIG. 4 is a block diagram depicting sequential autonegotiation in accordance with the present invention.

FIGS. 5A–5D together form a state diagram depicting a sequence of states of a multichannel autonegotiation controller in accordance with the present invention.

FIG. 5E shows the orientation of FIGS. 5A–5D with respect to one another.

DETAILED DESCRIPTION OF THE PREFERRED EMBODIMENTS

FIG. 1 is a system block diagram of a multiple channel communication system 10, having a plurality of network communication ports $12_{(N-1):0}$ (labeled port (n−1) to port 0), which are coupled to a plurality of link partners $13_{(n-1):0}$, respectively, where N is an integer greater than one. Multiple channel communication system 10 and link partners $13^{(n-1):0}$ can include a variety of devices, such as workstations, personal computers (PCs) or a multiport LAN switching hubs, for example.

Ports $_{12}$(n−1):0 are coupled to link partners $13_{(N-1):0}$ through network media $14_{(n-1):0}$, respectively. Network media $14_{(N-1):0}$ can include twisted wire pairs, coaxial cables or fiber optic cables, for example. In one embodiment, each communication port $12_{(N-1):0}$ is configured as an Ethernet Local Area Network (LAN) port. Each link partner $13_{(N-1):0}$ includes a corresponding Ethernet LAN port.

During initialization of ports $12_{(n-1):0}$, multiple channel communication system 10 autonegotiates a common mode of communication between each port and its respective link partner $13_{(N-1):0}$. Multiple channel communication system 10 autonegotiates ports $12_{(N-1):0}$ in a sequential fashion through a single autonegotiation controller within multiple channel communication system 10 rather than autonegotiating ports $12_{(N-1):0}$ in a parallel fashion through dedicated autonegotiation controllers as is common in the prior art. The autonegotiation function implemented within multiple channel communication system 10, with respect to each individual port, is preferably consistent with the well-known autonegotiation function and structure described in the ANSI/IEEE Ethernet standard 802.3u-1995, which is hereby incorporated by reference. The autonegotiation function allows each port $12_{(n-1):0}$ and its link partner $13_{(n-1):0}$ to advertise its communication abilities, acknowledge receipt of the other's abilities, understand the common mode(s) of operation that both devices share, and reject the use of operational modes that are not shared by both devices. Autonegotiation is performed upon a power-on reset of multiple channel communication system 10, when requested by management software within integrated circuit 10, when requested by one of the link partners $12_{(n-1):0}$, or when a link through network media $14_{(n-1):0}$ is disconnected and connected again.

FIG. 2 is block diagram showing multiple channel communication system 10 in more detail according to one embodiment of the present invention. Multiple channel communication system 10 includes communication ports $12_{(N-1):0}$, media access controller (MAC) 15, media independent interfaces (MIIs) $16_{(N-1):0}$, network communication (e.g. physical layer) devices $17_{(N-1):0}$, autonegotiation controller 18, autonegotiation register file 19, host-to-autonegotiation interface 20, host interface circuit 22 and host processor 24. Host processor 24 is coupled to host interface circuit 22 over host bus 26. Host interface circuit 22 is coupled to media access controller 15 over host interface bus 28. Host interface circuit 22 is coupled to host-to-autonegotiation interface 20 over bus 30. Host processor 24 performs the management functions of multiple channel communication system 10. Host interface circuit 22 provides an interface between host processor 24, media access controller 15, and host-to-autonegotiation interface 20.

Media access controller 15 preferably complies with the Media Access Control sublevel within the Data Link Layer of the International Standards Organization (ISO) Open System Interconnect (OSI) reference model. For example, media access controller 15 can include an Ethernet-110 (E-110) 10/100 Mbps Media Access Controller Core which is available from LSI Logic Corporation. The Ethernet-110 Core is described in the LSI Logic Corporation Ethernet-110 Core Technical Manual (November 1997), which is hereby incorporated by reference. Media access controller 15 is able to support 100Base-TX, -T4 and -FX for 100 Mbps applications and 10Base-T, -F or coaxial for 10 Mbps applications. Media access controller 15 manages data transmit and receive operations between host interface circuit 22 and network communication devices $17_{(N-1):0}$ through media independent interfaces (MIIs) $16_{(N-1):0}$. The data transmitted through media independent interfaces $16_{(N-1):0}$ conforms to the MII specifications in IEEE 802.3u. Media access controller 15 also supports MII management functions which allows host processor 24 to write control data to and read status information from various registers within network communication devices $17_{(N-1):0}$.

Each network communication device $17_{(N-1):0}$, in a preferred embodiment, includes a physical layer device (PHY) which conforms to IEEE Ethernet standard 802.3u. For example, network communication devices $17_{(N-1):0}$ can include a PHY-110 (10M bits per second/100M bits per second) Ethernet physical layer core available from LSI Logic Corporation, which is capable of being configured in 10 Base-T, 10 Base-T Full Duplex, 100 Base TX or 100 Base-TX Full Duplex operating modes according to the protocol specified in clause 28 of IEEE 802.3u. Each network communication device $17_{(N-1):0}$ interfaces between media access controller 15, its respective communication port $12_{(N-1):0}$ and autonegotiation controller 18.

Autonegotiation controller 18 is coupled to each of the network communication devices $17_{(N-1):0}$ and to autonegotiation register file 19. Autonegotiation controller 18 maintains a set of six registers for each network communication device $17_{(N-1):0}$ in register file 19 to support the autonegotiation function. These registers are well known and include a read-write MII Control Register, a read-only MII Status Register, a read-write Autonegotiation Advertisement Register, a read-only Autonegotiation Link partner Ability Register, a read-only Autonegotiation Expansion Register and a read-write Autonegotiation Next Page Transmit Register, which are defined in IEEE 802.3u. Since these registers are not shared among network communication devices $17_{(N-1):0}$, the MII management function in host processor 24 has access to all registers in all ports at any time. Thus, the shared autonegotiation function of controller 18 is transparent to the management function of host processor 24 with respect to any individual port $12_{(N-1):0}$.

In addition, autonegotiation controller 18 maintains a set of state variables in accordance with IEEE 802.3u for each network communication device $17_{(N-1):0}$ and maintains a set of four shared registers which are outside the scope of IEEE 802.3u and control the sequential iteration of the autonegotiation process of the present invention. These state variables and registers are described in greater detail below. Any appropriate number of ports may be incorporated onto multiple channel communication system 10 by providing sufficient registers within autonegotiation register file 19.

Autonegotiation controller 18 is coupled to host interface 22 through a standard serial host-to-autonegotiation interface 20. Interface 20 provides host processor 24 with access to the registers maintained in register file 19. Serial host autonegotiation interface 20 transfers input and output data over Management Data Input-Output lines MDIO and transfers a Management Data Clock over line MDC, preferably in accordance with IEEE 802.3u, clause 22.

Autonegotiation controller 18 provides a common, sequential autonegotiation function for network communication devices $17_{(N-1):0}$. Autonegotiation controller 18 performs the autonegotiation function for each port sequentially. On power-on or system reset, all ports $12_{(N-1):0}$ require autonegotiation. Autonegotiation for a given port is complete when that port and its link partner successfully resolve mutual capabilities. This is done either by exchanging link code words (which include data bytes indicative of communication capabilities) or by parallel detection (which is an additional detecting method that is performed if autonegotiation capability is not present or enabled in the link partner or the local device). Alternatively, the autonegotiation function may time out if a particular port does not complete autonegotiation for a specified period of time. If a time out occurs, autonegotiation controller 18 proceeds to autonegotiate the next port in the sequence which requires service.

Preferably, the period of time for a time out is selected to be larger than the worst case time taken by a given port to resolve a common mode of operation. For example, the following autonegotiation completion times have been measured for four configurations: Parallel detect 10BASE-T= 2.836 seconds; Parallel detect 100BASE-TX=2.501 seconds; Autonegotiation 10BASE-T=2.035 seconds; and Autonegotiation 100BASE-TX=1.868 seconds. Thus, an autonegotiation time out value of three seconds would be suitable.

Once autonegotiation controller 18 has serviced each of the ports $12_{12\ (N-1):0}$, autonegotiation controller 18 begins servicing any ports that timed-out in the first autonegotiation pass. This cycle continues until autonegotiation is complete on all ports. Autonegotiation controller 18 restarts autonegotiation for a particular port when the link for that port is broken or when requested by the management function within host processor 24. Autonegotiation controller 18 maintains an N-bit register in register file 19 which indicates on a bit-by-bit basis which port $12_{(N-1):0}$ needs servicing.

By requiring ports $12_{(N-1):0}$ to share autonegotiation controller 18, the number of semiconductor devices, or "gates", required to implement the autonegotiation function can be reduced significantly compared to conventional approaches with dedicated autonegotiation controllers. For example, an individual autonegotiation controller typically contains approximately 9,000 individual gates. Thus, for an eight-port system, the number of gates required for the autonegotiation function is approximately 72,000. As a result, it becomes difficult to integrate a high number of ports in a single integrated circuit using the dedicated autonegotiation controller approach. The shared autonegotiation controller of the present invention is expected to require only about 20,000 gates, resulting in a savings of about 52,000 gates as compared to the dedicated autonegotiation controller approach. This provides a great cost advantage and provides room on the integrated circuit for other features or more ports.

The additional time required to autonegotiate ports $12_{(N-1):0}$ sequentially does not significantly degrade the performance of multiple channel communication system 10 since the events that trigger autonegotiation do not occur often in a standard network. When autonegotiation is initiated for a particular port by the management function in host processor 24 or by a failure of that link, autonegotiation is performed on that port only. In this case, autonegotiation controller 18 adds no delay to the autonegotiation function. Autonegotiation controller 18 also optimizes the standard autonegotiation procedure for sequential cyclical execution, which reduces the disparity in total autonegotiation execution time between the conventional dedicated autonegotiation approach and the present invention during a power-on condition or system reset.

As mentioned above, autonegotiation controller 18 maintains four shared registers in register file 19 which are used to control the sequential iteration of the autonegotiation function. Those registers include a one-bit first service flag "first_service", a time out counter "time_out", an N-bit autonegotiation pending register "ANPND[(N−1):0]", and an N-bit latched autonegotiation pending register "LANPND[(N−1):0]".

The first_service flag indicates whether ports $12_{(N-1):0}$ are being serviced for the first time after power-on. This flag is used to initiate a break_link_timer at least once after a power-on or reset condition of multiple channel communication system 10. Break_link_timer is a timer maintained by is autonegotiation controller 18 which, during execution, causes a lull on the network link of the port that is presently being serviced. The link lull lasts long enough for the link partner $13_{(N-1):0}$ (shown in FIG. 1) to recognize a link fail condition and begin reinitializing its communication. When the logic state of the first_service flag is true, such a condition indicates that break_link_timer has not yet been executed after power-on and needs to be executed. When the logic state of the first_service flag is false, such a condition indicates that break_link_timer has been executed at least once after power-on.

The Time_out counter maintains a count corresponding to the time elapsed during autonegotiation for the present port. Autonegotiation controller 18 uses this counter to check if autonegotiation has completed within a specified period of time. If autonegotiation has not completed within the specified period of time, autonegotiation controller 18 stops autonegotiation for the present port and moves to the next port in the sequence that requires autonegotiation. In one embodiment, the specified period of time is set to a default value of three seconds. However host processor 24 can program this register so that the counter times out after a time of up to eight seconds, for example.

Autonegotiation pending register ANPND[(N−1):0] indicates whether autonegotiation is required for ports $12_{(N-1):0}$, respectively. There is one bit in the register for each port $12_{(N-1):0}$. FIG. 3A is an example of an autonegotiation pending register for a system having eight ports, where N=8. The individual bit locations of ANPND[7:0] are labeled "7" to "0", as indicated by arrow 29. Each bit of autonegotiation pending register ANPND[7:0] corresponds to one of the eight ports $12_{7-0}$. When an individual bit X in ANPND[7:0] is true (i.e., set to logical "1"), autonegotiation needs to be performed on the corresponding port $12_X$, where X is an integer from zero to seven. When an individual bit X in ANPND[7:0] is false (i.e. reset to logical "0"), autonegotiation is not required for the corresponding port $12_X$. In the example shown in FIG. 3A, all bits in ANPND[7:0] are set, indicating that all ports $12_{7-0}$ need servicing.

FIG. 3B is a diagram of latched autonegotiation pending register LANPND[(N−1):0], for N=8. LANPND[7:0] is a latched version of ANPND[7:0]. Each time break_link_timer is started, autonegotiation controller 18 latches the information contained in ANPND[7:0] into LANPND[7:0]. Autonegotiation controller 18 can detect changes in the requirement for autonegotiation for port $12_X$ by contrasting LANPND[X] and ANPND[X]. This allows autonegotiation controller 18 to avoid initiating break_link_timer for a given port, if the autonegotiation request for that port was generated before break_link_timer was initiated for any of the previous ports in the autonegotiation sequence. Thus, every time autonegotiation is completed for a port or the autonegotiation has timed out, bit values from the ANPND[7:0] register are compared with bit values in the LANPND[7:0] register. If the bit values match, then the autonegotiation cycle proceeds to the next pending port without initiating break_link_timer. However, if the bits corresponding to the present port do not match, and if the compared bit in ANPND[7:0] is set, and reset in LANPND[7:0], the new values are latched from ANPND[7:0] to LANPND[7:0] and break_link_timer is started. This is necessary to Lake sure that before a is new port is serviced, break_link_timer expires. By following this approach, a considerable amount of time to complete autonegotiation is saved since break_link_timer is not initiated on every port.

FIG. 4 is a flow chart illustrating ANPND[7:0] during sequential steps through an autonegotiation sequence according to one embodiment of the present invention. At step 30, upon power-on or system reset, autonegotiation controller 18 begins the autonegotiation sequence.

Presumably, all ports $12_{7-0}$ require autonegotiation as indicated by the ANPND[7:0] register containing all ones in all bit locations. From state 30 to state 32, autonegotiation controller 18 attempts to resolve autonegotiation through each port $12_{7-0}$ sequentially. Suppose, for the sake of illustration, that after the first iteration of autonegotiation attempts, only two ports, port $12_0$ indicated by ANPND[0] and port $12_5$ indicated by ANPND[5] are not resolved. ANPND[5, 0] remain a logical "1". Autonegotiation controller 18 then begins servicing each of the unresolved ports $12_5$ and $12_0$ sequentially, until autonegotiation is successful for both ports.

If, however, any other port breaks (loses its link) during the autonegotiation of port $12_5$ or port $12_0$, that broken port will need to have autonegotiation performed again. Such a condition is shown at step 34 where ANPND[7] has been set to "1". By comparing LANPND[7] and ANPND[7], autonegotiation controller 18 determines that port $12_7$ changed status during the autonegotiation of the previous ports such that it now requires autonegotiation. Autonegotiation controller 18 causes break_link_timer to execute prior to autonegotiation port $12_7$. Finally, at step 36, all ports have successfully completed autonegotiation. Autonegotiation controller 18 thereafter periodically polls the ANPND[7:0] register, as shown by arrow 38, to determine if any port subsequently needs autonegotiation.

State Diagram And Sate Variables For
Autonegotiation Arbitration Function

FIGS. 5A–5D together form a state diagram which illustrates the common autonegotiation arbitration function implemented by autonegotiation controller 18 according to one embodiment of the present invention. FIG. 5E shows the orientation of FIGS. 5A–5D with respect to one another. The following state variables are used in the state diagrams and maintained by autonegotiation controller 18 in autonegotiation register file 19 (shown in FIG. 2). These state variables are consistent with those defined in IEEE 802.3. However, several of the variables have been expanded to include multiple bits to accommodate the common autonegotiation function of the present invention.

Ability_match_[X] is a variable that indicates whether, for port [X] (e.g. port $12_X$ in FIGS. 1 and 2), three consecutive matching Link Code Words have been received one after the other, ignoring an acknowledge bit in the Code Words, regardless of whether the words have already been used in a word-match comparison. Autonegotiation controller 18 sets Ability_match_[X] to true when three matching consecutive Link Code Words have been received.

Ack_finished_[X] indicates whether the final remaining_ack_cnt Link Code Words with the Acknowledge bit set have been transmitted for port [X]. The Acknowledge bit indicates whether the link partner of port [X] has successfully received port [X]'s Link Code Word. The value of remaining_ack_cnt corresponds to the number of additional link code words that must be sent with their Acknowledge bit set to logic "1" to ensure that the link partner receives the acknowledgement. Remaining_ack_cnt may take an integer value from 0 to 8. When ack_finished_[X] is false, more Link Code Words with the Acknowledge bit set must be transmitted. When ack_finished[x] is true, all remaining Link Code Words with the Acknowledge bit set have been transmitted.

Acknowledge_match indicates whether three consecutive Link Code Words match and have the Acknowledge bit set. When this variable is false, three matching consecutive Link Code Words have not been received with the Acknowledge bit set. When this variable is true, three matching and consecutive Link Code Words have been received with the Acknowledge bit set.

Base_page_[X] indicates whether the page currently being transmitted by autonegotiation controller 18 is the initial Link Code Word used to communicate the port [X]'s abilities. When this value is false, a page other than base Link Code Word is being transmitted. When this value is true, the base Link Code Word is being transmitted.

Complete_ack controls whether Link Code Words which have their Acknowledge bit set will be counted. When this variable is false, the transmitted Link Code Words with the Acknowledge bit set are not counted. When this variable is true, the transmitted Link Code Words with the Acknowledge bit set are counted.

Consistency_match indicates whether the Link Code Word that caused ability_match to be set is the same as the Link Code Word that caused acknowledge_match to be set. When this variable is false, the Link Code Word that caused ability match to be set is not the same as the Link Code Word that caused acknowledge_match to be set, ignoring the Acknowledge bit value. When this variable is true, the Link Code Word that caused ability_match to be set is the same as the Link Code Word that caused acknowledge_match to be set, independent of the Acknowledge bit value.

Desire_np indicates whether port [X] desires to engage in next page exchange. Next page exchange is an optional feature in which port [X] and its link partner may exchange additional autonegotiation information. Autonegotiation controller 18 indicates whether port [X] desires to engage in next page exchange by setting an NP bit in the base Link Code Word, which is stored in the auto—negotiation advertisement register for port [X] in register file 19. When the desire_np variable is false, port [X] does not desire next page exchange. Conversely, when desire_np is true, port [X] desires next page exchange.

FLP_link_good indicates whether auto-negotiation has completed. When this variable is false, autonegotiation is in progress. Conversely, when this variable is true, autonegotiation is complete.

FLP_receive_idle indicates whether autonegotiation controller 18 is in an IDLE LINK PULSE DETECT receive state or a LINK PULSE COUNT receive state, as defined in IEEE 802.3. When this variable is false, the autonegotiation controller 18 is not in the IDLE LINK PULSE DETECT state or LINK PULSE COUNT state. When this variable is true, autonegotiation controller 18 is in the IDLE LINK PULSE DETECT or LINK PULSE COUNT state.

Link_control_[X] assumes, for each port [N–1:0], one of three values, SCAN_FOR_CARRIER, DISABLE, or ENABLE for controlling the physical medium attachment (PMA) of the link. SCAN_FOR_CARRIER mode is used by autonegotiation controller 18 prior to receiving any FLP bursts or link_status_[X]=READY indications. During this mode, the PMA searches for a carrier and reports link_status_[X]=READY when the carrier is received, but no other action is enabled in this mode. When autonegotiation controller 18 sets link_control_[X]=DISABLE, then PMA processing is disabled. When auto-negotiation controller 18 sets link_control_[X]=ENABLE, then control is turned over to a signal the PMA for all normal processing functions. Thus, network communication would subsequently be handled by the PMA.

Link_status [X] indicates whether communication between the port [X] and its link partner is intact and ready to be enabled, intact and enabled, or not intact. For example, this variable is used after control is passed to a specific PMA to determine whether the PMA has established appropriate network communication.

Mr_autoneg_complete_[X] indicates whether autonegotiation has completed for port [X]. Mr_autoneg_enable_[X] controls the enabling and disabling of the autonegotiation function for port [X]. Mr_lp_np_able_[X] indicates whether the link partner for port [X] supports next page exchange. mr_np_able_[X] indicates whether port [X] supports next page exchange. Mr_lp_autoneg_able_[X] indicates whether the link partner for port [X] supports autonegotiation.

Mr_next_page_loaded_[X] indicates whether a new page has been loaded into the next page transmit register of port [X] within register file 19. The autonegotiation next page transmit register contains the next page Link Code Word to be transmitted when next page ability is supported. When this variable is false, a new page has not been loaded. Conversely, when this variable is true, a new page has been loaded.

Mr_page_rx_[X] indicates whether a new page has been received for port [X]. A new page has been successfully received when acknowledge_match=TRUE, consistency_match=TRUE and the Link Code Word has been written to the link partner's advertised abilities register mr_lp_adv_ability[16:1]. When this variable is false, a new page has not been received. When this variable is true, a new page has been received.

Mr_parallel_detection_fault_[X] indicates an error condition for port [X] during parallel detection. Rx_link_code_word_[X]_[16:1] contains the data bits to be received from an FLP burst for port [X].

Single_link_ready is a status bit which is true if exactly one of the indications link_status_[NLP]=READY, link_status_[TX]=READY, or link_status_[T4]=READY and if FLP_receive_idle=TRUE.

Toggle_rx is a flag to keep track of the state of the link partner's toggle bit. The toggle bit is used by the arbitration function to ensure synchronization with the link partner during next page exchange. This bit takes the opposite value of the toggle bit in the previously exchanged Link Code Word. The initial value of the toggle bit in the first Next Page transmitted is the inverse of bit 11 in the base Link Code Word and, therefore, may assume a value of logic one or zero. When toggle_rx is zero, the link partner's toggle bit equals logic zero. Conversely, when toggle_rx=one the link partner's toggle bit equals logic one.

Toggle_tx is a flag used to keep track of the state of the toggle bit for auto-negotiation controller 18. As stated earlier, toggle bits are used by the arbitration function to ensure synchronization with the link partner during next page exchange. Thus, when toggle_tx=zero, the autonegotiation controller's toggle bit equals logic zero. Conversely, when toggle_tx equals one then the toggle bit of autonegotiation controller 18 equals logic one.

Transmit_ability[X] controls the transmission of the Link Code Word containing tx_link_code_word_[X]_[16:1] (described below). When this variable is false, any transmission of tx_link_code_word_[X]_[16:1] is halted (default) when this variable is true, the local device begins sending tx_link_code_word_[X]_[16:1].

Transmit_ack[X] controls the setting of the Acknowledge bit in the tx_link_code_word_[X]_[16:1] to be transmitted for port [X]. When this variable is false, the Acknowledge bit in the transmitted tx_link_code_word_[X]_[16:1] is set to a logic zero (default). When this variable true, the Acknowledge bit in the transmitted tx_link_code_word_[X]_[16:1] is set to a logic one.

Transmit_disable[X] is a state variable which controls the transmission of tx_link_code_word_[X]_[16:1] for port [X]. When this variable is false, tx_link_code_[X]_[16:1] transmission is allowed (default). When this variable is true, tx_link_code_[X]_[16:1] transmission is halted.

Tx_link_code_word_[X]_[16:1] contains the data bits to be transmitted in an FLP burst from port [X] to its link partner.

Autoneg_wait_timer is a timer used to time the amount of time to wait before evaluating the number of link integrity test functions which have link_status=READY asserted. The autoneg_wait_timer preferably expires 500 ms to 1,000 ms from the assertion of link_status=READY.

Break_link_timer determines the amount of time to wait in order to assure that the link partner enters a link fail state. This is a state in which the link partner recognizes that network communication on the link has been broken and autonegotiation must be initialized. This timer preferably expires 1,200 to 1,500 ms after being started.

Link_fail_inhibit_timer is a timer used for qualifying a link_status=fail indication or link_status=ready indication when a specific technology link is first being established. A link will only be considered "failed" if the link_fail_inhibit_timer has expired and the link has still not gone into the link_status=OK state. The link_fail_inhibit_timer preferably expires 750 ms to 1000 ms after entering the FLP link good check state (which will be described in further detail with respect to FIG. 6D. It is important for the link_fail_inhibit_timer expiration value to be greater than the time required for the link partner to complete autonegotiation after the local device has completed autonegotiation plus the time required for the specific technology to enter the link_status equals OK state.

Operation of Autonegotiation Arbitration Function

Referring now to FIG. 5A, autonegotiation begins initially during a reset at arrow 39. This condition is triggered by either a power-on condition, or setting MR_Main_Reset to true by either the management function of host processor 24 (shown in FIG. 2) or user interaction. When this condition occurs, autonegotiation controller 18 passes to state 40, entitled Auto-Neg Enable. Autonegotiation controller 18 maintains a port counter variable "X" which indicates which of the ports [(N−1):0] is presently being serviced. In this example, the port counter [X] is arbitrarily initialized to zero. Additionally, autonegotiation controller 18 sets the first_service flag to true, which indicates that autonegotiation is proceeding for the first time after the power-on or system reset.

After state 40, autonegotiation controller 18 passes unconditionally, as indicated by "UCT" to state 42, which is entitled Latch Port Status. In this state, the LANPND[(N−1):0] register is copied from the ANPND[(N−1):0] register. Typically, during power-on, all ports will request autonegotiation and, as a result, all bits in the ANPND[(N−1):0] register will be set. Thus, all bits in LANPND[(N−1):0] will initially be set after the initial power on or system reset. Autonegotiation controller 18 passes selectively from state 42 to either Transmit Disable state 44, or Next_Port state 46, depending on whether the bit LANPND[X] for the current port [X] is set or reset, respectively.

When LANPND[X] bit is set, control passes to Transmit_Disable state 44. In this state, the break_link_ timer is started. During the Lime that break_link_timer is executing, no activity occurs on the link between the port [X] and its link partner (i.e. link partner $13_X$ in FIG. 1). This ensures that the link partner recognizes a break_link condition and begins autonegotiation. Additionally, at this stage, for the current port [X], the transmit disable flag is set to is true; MR_page_rx flag is set to false; MR autoneg_complete[X] is set to false; and MR_next_page_loaded[X] is set to false. Further, the time out timer is started and the first_service flag is set to false.

Upon the completion of break_link_timer, autonegotiation controller 18 passes from Transmit_Disable state 44 to Ability Detect State 52 (shown in FIG. 5B) through output "B" which will be described in further detail with respect to FIG. 5B. It should also be noted that autonegotiation controller 18 may enter Transmit_Disable state 44 from Acknowledge Detect State 54 (shown in FIG. 5B) through output "A", which will be described in further detail with respect to FIGS. 5B and 5D.

Referring back to Latch Port Status state 42 if, LANPND [x] is reset, then autonegotiation controller 18 control passes to Next_Port state 46. Such condition indicates that the current port does not require autonegotiation. Thus, when control passes to Next_Port state 46, autonegotiation controller 18 advances the current port number[X] by one and enters check Auto-Neg state 48. At this stage, the Time_Out timer is started and the ANPND[(N–1):0] and LANPND [(N–1):0] registers and the first_service flag are checked to determine the next step. If ANPND[x] for the current port [X] is reset, which indicates that the current port does not require autonegotiation, autonegotiation controller 18 passes to Next Port state 46 to increment the port number. If first_service equals true or the ANPND bit ANPND[x] for the current port [x] is set while LANPND[x] for the current port [X] is reset, such condition indicates that the current port [X] changed its autonegotiation request status during autonegotiation of the prior port. Thus, it is necessary to reexecute the break_link_timer. As a result, if this condition occurs, autonegotiation controller 18 passes from Check Auto-Neg state 48 to Latch Port Status state 42. If, however, ANPND[X] and LANPND[X] are both set while the first_service flag is false, then autonegotiation controller 18 passes to ability detect state 52 through output "C", which will be described in greater detail with respect to FIG. 5B.

If the time_out timer that was started in state 48 becomes true, indicating that the autonegotiation function for port [X] has timed out, then autonegotiation controller 18 enters disable XMT state 50. In state 50, autonegotiation controller 18 sets transmit_disable_[X] to true, which terminates the attempt to complete autonegotiation for the current port [X]. Disable XMT state 50 essentially functions to disable transmission for the current port [x] much like Transmit_Disable state 44. However, Disable XMT state 50 does not initiate the break_link_timer. Autonegotiation controller 18 enters Disable XMT state 50 when either time_out becomes true or control is passed from Next-Page Wait State 62 through output "H", which will be described in further detail with respect to FIG. 5C. Disable XMT state 50 passes control unconditionally to Next_Port state 46.

Autonegotiation controller 18 may also enter Next_Port state 46 from FLP Link Good State 66, through input "D" which will be described in further detail with respect to FIG. 5D. Essentially, control passes from FLP Link Good State 66 block D to Next_Port State 46 when port [X] successfully autonegotiates.

FIG. 5B shows Ability Detect state 52, Acknowledge Detect state 54, Link Status Check state 56 and Parallel Detection Fault state 58. Autonegotiation controller 18 enters Ability Detect state 52 from Parallel Detection Fault state 58, Transmitter Disable state 44 (shown in FIG. 5A), or Check Auto-Neg state 48 (shown in FIG. 5A). Ability Detect state 52 functions identically to the ability detect state disclosed in IEEE Standard 802.3u with the exception that many of the state variables of the present invention have multiple bit positions with individual bit positions corresponding to the various ports in multiple channel communication system 10.

Autonegotiation controller 18 passes from Ability Detect state 52 to Acknowledge Detect state 54 if ability_match is true, or Link Status Check state 56 if either link_status_ [x]_[tx]=ready or link_status_[x]_[NLP]=ready. Ability_match equals true if the link partner of port [X] has provided link code words (LCWs) indicative of communication abilities which match the LCWs for port [X]. In state 54, autonegotiation controller 18 essentially waits until a sufficient number of code words indicative of the communication abilities have been received from the link partner. Autonegotiation controller 18 then sets the consistency_match flag to true and passes to Complete Acknowledge State 60 through output "G", which will be described in greater detail with respect to FIG. 5D. Alternatively, if a sufficient number of code words are not received from the link partner, then autonegotiation controller 18 passes to Transmit_Disable State 44 as described above.

Alternatively, autonegotiation controller 18 passes from Ability Detect State 52 to Link Status Check state 56 if link_status_[x]_[TX] equals "Ready" or link_status_ [x]_[NLP] equals "Ready". Link status_[X]_[TX] will equal "Ready" when the TX core is receiving idle pulses. Thus, when link_status_[X]_[TX] equals ready it is essentially a request from the TX core to be enabled because it is receiving idle cells. Link_status_[X]_[NLP] will equal ready when the NLP link pulse has been identified. The identification of the NLP link pulses disclosed in IEEE standard 802.3 and the identification of link pulses in the present invention is the same as that disclosed in the IEEE standard. In state 56, autonegotiation controller 18 starts autoneg_wait_timer and sets transmit_disable equal to true. When autoneg_wait_timer is done, autonegotiation controller 18 checks whether single_link_ready is true or false. This flag indicates whether a single link becomes ready within the duration of autoneg_wait_timer.

If a single link becomes ready, autonegotiation controller 18 passes to FLP Link Good State 64 through output "F" which will be described in greater detail with respect to FIG. 5D. If, however, a single link does not become ready, such that single_link_ready is false, then autonegotiation controller 18 passes to Parallel Detection Fault state 58. Parallel Detection fault state 58 operates similarly to the parallel detection fault state provided in the IEEE Standard 802.3u, clause 28, with the exception that the corresponding state variables are multiple bit variables with one bit for each port [(N–1):0]. Control passes unconditionally from Parallel Detection Fault state 58 to Ability Detect state 52.

Referring now to FIG. 5C, autonegotiation controller 18 passes to Complete Acknowledge state 60 from Acknowledge Detect state 54 (shown in FIG. 5B) when acknowledge_match equals true and consistency_match equals true. Complete Acknowledge state 60 functions similarly to the complete acknowledge state disclosed in the IEEE Standard 802.3u, clause 28. Again, multiple bit state variables are used with the present invention. In state 60, if both port [X] and its link partner support next page transfer abilities, and a next page is desired which is indicated by desire_NP equal to true, then autonegotiation controller 18 passes to Next Page Wait state 62.

In next page wait state 62, transmit_ability_[X] is set equal to true; mr_page_rx_[X] is reset; base_page_[X] is reset; tx_link_code_word is set equal to mr_np_tx_[X]_[16:13]; tx_link_code_word_[12] is set to toggle_tx; tx_link_code_word_[11:1] is set equal to mr_np_tx_[X]_[11:1]; ack_finished is reset; and mr_next_page_loaded_[N] is reset. Next Page Wait state 62 operates similarly to the next page wait state of the IEEE Standard 802.3u, clause 28, for port [X]. Thus, if FLP_receive_idle equals true, then autonegotiation controller 18 passes from Next Page Wait state 62 to Disable XMT state 50, shown in FIG. 5B. However, if ability_match is true and toggle_rx and rx_link_code_word[12] are not the same, then autonegotiation controller 18 passes to acknowledge detect state 54, shown in FIG. 5A.

If next page transmission is not supported, or if an additional page is not desired, then autonegotiation controller 18 passes from Complete Acknowledge state 60 to FLP Link Good Check state 64, shown in FIG. 5D. Referring to FIG. 5D, autonegotiation controller 18 may enter FLP Link Good Check 64 from Link Status Check state 56 shown in FIG. 5B under appropriate conditions. Essentially, in state 64, autonegotiation controller 18 disables potential communication protocols except for the highest common communication protocol which is supported by the current port [X] and its link partner. When such highest common protocol is enabled, autonegotiation controller 18 passes from FLP Link Good Check state 64 depending on whether the link_status for that particular communication protocol PMA returns "OK". If link_status_[N]_[HCD] does not equal "OK", then autonegotiation controller 18 enters transmit_disable state 44 shown in FIG. 5A. If, however, the link_status flag returns "OK", then autonegotiation controller 18 passes to FLP Link Good state 66.

FLP Link Good state 66, operates similarly to the FLP link good state in the IEEE standard 802.3u-1995. Thus, autonegotiation controller 18 sets the FLP_link_good_[X] flag to true and also sets the MR_autoneg_complete_[X] flag equal to true. However, state 66 differs from the state provided in the standard in that upon completion of setting the FLP_link_good flag and the MR_autoneg_complete flag, autonegotiation controller enters Next Port state 46 shown in FIG. 5A. This allows the present invention to sequentially autonegotiate multiple ports.

In addition to the autonegotiation arbitration function disclosed in the state diagram formed by FIGS. 5A–5D, Autonegotiation controller 18 also performs the autonegotiation transmit and receive functions disclosed in the state diagrams provided in IEEE standard 802.3.

Conclusion

The present invention provides a shared autonegotiation function across multiple serial communication ports, such as in a multiple-port Ethernet local area network. By sharing the autonegotiation controller, the gate count required to implement the autonegotiation function can be significantly reduced. This allows an increased number of ports or additional functions to be incorporated onto a single integrated circuit, such as an application specific integrated circuit (ASIC). Further, though the present invention executes autonegotiation sequentially, the autonegotiation function itself is optimized so as not to reexecute the break_link_timer for each port. Since, when break_link_timer is executed for one port, there is no activity on all ports. This has the effect of executing break_link_timer on all ports. Thus, the present invention provides significant logic optimization in return for a relatively modest decrease in total autonegotiation time across multiple ports.

Although the present invention has been described with reference to preferred embodiments, workers skilled in the art will recognize that changes may be made in form and detail without departing from the spirit and scope of the invention. For example, any suitable media access controller and physical layer device which support autonegotiation can be used with the present invention.

What is claimed is:

1. A method of autonegotiating communication configuration information through a plurality of communication devices on a single integrated circuit, the method comprising:

defining a sequential order for autonegotiating each of the communication devices;

maintaining a first autonegotiation status register wherein each bit indicates whether autonegotiation is required for a corresponding one of the communication devices;

selectively autonegotiating the communication configuration information through each of the plurality of communication devices in the sequential order based on whether the corresponding autonegotiation status indicator indicates that autonegotiation is required for that communication device wherein selectively autonegotiating includes:

the step of selectively autonegotiating comprises:

polling a bit in the first autonegotiation status register that corresponds to a first of the communication devices;

initiating a break link timer which measures a predetermined period of time if the polled bit indicates autonegotiation is required for the first communication device;

copying each bit of the first multiple-bit autonegotiation status register into a second multiple-bit autonegotiation status register each time the break link timer is initiated;

ceasing communication through the first communication device during the predetermined period of time measured by the break link timer;

autonegotiating through the first communication device after ceasing communication through the first communication device;

autonegotiating through a subsequent one of the communication devices in the sequential order after autonegotiating through the first communication device if the corresponding bit in the first autonegotiation status register indicates autonegotiation is required for the subsequent communication device;

re-initiating the break link timer if the bit in the first autonegotiation status register corresponding to the subsequent communication device indicates autonegotiation is required and the bit in the second autonegotiation status register corresponding to the subsequent communication device indicates autonegotiation is not required; and ceasing communication through the second communication device for the predetermined period of time prior to autonegotiating through the second communication device only if the break link timer is re-initiated.

\* \* \* \* \*